(12) United States Patent
Dammann et al.

(10) Patent No.: US 12,704,164 B2
(45) Date of Patent: Aug. 11, 2026

(54) FRICTION DAMPER

(71) Applicant: SUSPA GmbH, Altdorf (DE)

(72) Inventors: Thorsten Dammann, Leinburg (DE); Andreas Pelczer, Altdorf (DE); Michael Weder, Nuremberg (DE)

(73) Assignee: SUSPA GMBH, Altdorf (DE)

( * ) Notice: Subject to any disclaimer, the term of this patent is extended or adjusted under 35 U.S.C. 154(b) by 378 days.

(21) Appl. No.: 18/453,438

(22) Filed: Aug. 22, 2023

(65) Prior Publication Data

US 2024/0093747 A1 Mar. 21, 2024

(30) Foreign Application Priority Data

Sep. 20, 2022 (DE) ..................... 10 2022 209 864.1

(51) Int. Cl.
*F16F 7/08* (2006.01)
*F16F 7/09* (2006.01)

(52) U.S. Cl.
CPC .............. *F16F 7/085* (2013.01); *F16F 7/095* (2013.01); *F16F 2222/04* (2013.01); *F16F 2228/066* (2013.01); *F16F 2230/0005* (2013.01); *F16F 2230/0041* (2013.01); *F16F 2230/0047* (2013.01); *F16F 2230/08* (2013.01); *F16F 2230/18* (2013.01); *F16F 2232/08* (2013.01)

(58) Field of Classification Search
CPC ........ F16F 7/085; F16F 7/095; F16F 2222/04; F16F 2228/066; F16F 2230/0041; F16F 2230/0047; F16F 2230/08; F16F 2230/18; F16F 2232/08
USPC ............. 74/89, 582; 267/64.12; 49/340, 343
See application file for complete search history.

(56) References Cited

U.S. PATENT DOCUMENTS

| | | | | |
|---|---|---|---|---|
| 6,516,567 B1 * | 2/2003 | Stone | E05F 15/622 | 49/343 |
| 7,226,111 B2 * | 6/2007 | Berklich, Jr. | E05F 15/622 | 49/343 |
| 7,566,092 B2 * | 7/2009 | Paton | E05F 15/622 | 296/106 |
| 8,001,861 B2 * | 8/2011 | Fisher | F16H 25/20 | 74/89.36 |

(Continued)

FOREIGN PATENT DOCUMENTS

| | | |
|---|---|---|
| DE | 102017215933 A1 | 3/2018 |
| DE | 102020206722 A1 | 12/2021 |

(Continued)

*Primary Examiner* — Christopher P Schwartz
(74) *Attorney, Agent, or Firm* — McGlew and Tuttle, P.C.

(57) ABSTRACT

A friction damper includes a housing having a longitudinal axis, a tappet that is displaceable along the longitudinal axis, a friction unit for generating a direction-dependent friction force on the tappet, wherein the friction unit includes at least one friction lining that rests frictionally on the tappet and a friction lining carrier on which the at least one friction lining is held, wherein the friction lining carrier is arranged to be displaced relative to the tappet between an extraction position and an insertion position, as well as a switching unit for variably setting the friction force, wherein the switching unit includes a switchable actuator, a locking element and a force transmission unit which is mechanically coupled to the actuator and to the locking element, wherein the force transmission unit comprises a threaded spindle.

24 Claims, 7 Drawing Sheets

(56) References Cited

U.S. PATENT DOCUMENTS 10,280,674 B2 * 5/2019 Leonard ................ E05F 1/1041
11,946,522 B2 * 4/2024 Weder ..................... F16F 7/095
2008/0256986 A1 10/2008 Ackermann et al.
2015/0354653 A1 12/2015 Kaniöz
2018/0073589 A1 3/2018 Weder et al.
2019/0106925 A1 * 4/2019 McCorkell .............. F16H 25/24

FOREIGN PATENT DOCUMENTS

EP 1584730 A2 10/2005
EP 3869062 A1 8/2021

* cited by examiner 1
2
3
4
5
6
7
8
9
12
13
14
15
16
17
20
24
25
26
27
34
35
36
37
39
41
42
43
44
45
46
47
50
51
52
60
61
n 26
25
4
3
V
6
11
10
2
5
1
56
57
24
45
V
27

FRICTION DAMPER

CROSS-REFERENCES TO RELATED APPLICATIONS

This application claims the priority of German Patent Application, Serial No. DE 10 2022 209 864.1, filed Sep. 20, 2022, the content of which is incorporated herein by reference in its entirety as if fully set forth herein.

FIELD OF THE INVENTION

The invention relates to a friction damper.

BACKGROUND OF THE INVENTION

A direction-dependent friction damper is known from EP 3 869 062 A1. This friction damper has a switching unit with which a friction force generated by the friction damper can be variably set. For this purpose, the switching unit has a switchable actuator and a locking element which is mechanically coupled thereto.

SUMMARY OF THE INVENTION

It is an object of the present invention to improve the variable setting of the friction force and thus the applicability of the friction damper.

This object is achieved according to the invention by a friction damper comprising a housing having a longitudinal axis, a tappet that is displaceable along the longitudinal axis, a friction unit for generating a direction-dependent friction force on the tappet, wherein the friction unit comprises at least one friction lining that rests frictionally on the tappet and a friction lining carrier on which the at least one friction lining is held, wherein the friction lining carrier is arranged to be displaced relative to the tappet between an extraction position and an insertion position, a switching unit for variably setting the friction force, wherein the switching unit comprises a switchable actuator, a locking element, a force transmission unit which is mechanically coupled to the actuator and to the locking element, wherein the force transmission unit comprises a threaded spindle.

According to the invention, it has been recognized that in a friction damper, the friction force can be advantageously variably set if a switching unit has a force transmission unit that mechanically advantageously couples an actuator with a locking element. The force transmission unit comprises a threaded spindle with which exact positioning of the locking element by means of the switchable actuator is ensured. In particular, the threaded spindle enables a robust transmission of force from the actuator to the locking element.

The actuator is at least single-acting and can be double-acting, thus enabling active switching in different, in particular opposite directions, in particular in opposite linear directions. The actuation of the locking element along a displacement direction is thus simplified. In particular, the actuator is configured such that it can be actively switched in at least one direction and in any case does not impede actuation of the locking element in the opposite direction. In particular, the locking element can be displaced in the opposite direction by external force.

Alternatively, the actuator can be configured to be single acting, i.e. only actively switched in one of the two linear directions.

The friction damper is in particular suitable for use in a washing machine or in a tumble dryer.

The friction force is generated by a friction unit in a direction-dependent manner. The friction force acts on a tappet which can be displaced along a longitudinal axis of a housing of the friction damper. The friction force generated by the friction unit is direction-dependent, in particular dependent on the displacement direction of the tappet, i.e. along an extraction direction of the tappet from the housing or along an insertion direction of the tappet into the housing. Direction-dependent means that the friction force in the insertion direction differs in amount from the friction force in the extraction direction. In particular, the friction force acting in the extraction direction, also referred to as extraction friction, is greater than the friction force acting in the insertion direction, also referred to as insertion friction. To generate the friction force, the friction unit has at least one friction lining which rests against the tappet in a friction manner.

The friction force can be variably set by means of the switching unit. In particular, the amount of the friction force can be set variably, in particular in steps. In particular, the amount of the friction force can be set depending on the direction and/or independently of the direction. In particular, the amount of the friction force is set in the extraction direction and can be variably set in particular in the insertion direction, in particular continuously increasing along the insertion direction. This means that when the tappet is actuated in the insertion direction, the friction force is greater the further the tappet is inserted into the housing. The amount of the friction force is in particular amplitude-dependent, in particular in a displacement region of the friction lining carrier between an extraction position and an insertion position. The extraction position and the insertion position of the friction lining carrier are dependent on the actuation direction of the tappet. The tappet is also called a sliding tube. The extraction position and the insertion position each form so-called extreme positions of the friction lining carrier, which determine a maximum or minimum friction force. The amount of the friction force is in particular direction-dependent.

The switching unit interacts with the friction unit to variably set the friction force. If the friction force is set by means of the switching unit for an extreme position of a friction lining carrier of the friction unit, the friction force is in particular not direction-dependent but direction-independent. This means that the friction force in the extreme positions of the friction lining carrier is direction-independent if it is set by the switching unit. In this case, the amount of the friction force is identical in the insertion direction and in the extraction direction. The extreme positions are in particular a minimum position and a maximum position of the friction lining carrier. In the minimum position of the friction lining carrier, in particular a minimum insertion force is exerted on the tappet in the insertion direction. In the maximum position, in particular a maximum friction force is exerted on the tappet in the insertion direction.

The friction lining carrier can also assume at least one intermediate position between the extreme positions. The friction lining carrier can also assume several different intermediate positions, in particular at least two intermediate positions, in particular at least three intermediate positions, in particular at least four intermediate positions, in particular at least five intermediate positions, in particular at least ten intermediate positions, in particular at least 15 intermediate positions and in particular at most 20 intermediate positions. In particular, it is possible to fix the friction lining carrier in the at least one intermediate position by means of the switching unit in such a manner that an actuation of the tappet in the insertion direction causes a displacement of the friction lining carrier and thus the friction force in the insertion direction changes, whereas an actuation of the tappet in the extraction direction does not cause a displacement of the friction lining carrier, so that a constant friction force acts in the extraction direction.

It is particularly advantageous to lock the friction lining carrier in a maximum position by means of the switching unit, so that a maximum friction force is ensured, in particular at small strokes. A small stroke is in particular given if the axial movement of the tappet is smaller than 25% of the maximum stroke of the friction damper, in particular smaller than 20%, in particular smaller than 15%, in particular smaller than 10%, in particular smaller than 5% and in particular smaller than 2%.

An embodiment of the friction unit with a friction lining carrier on which the at least one friction lining is held, wherein the friction lining carrier is arranged to be displaceable relative to the tappet between an extraction position and an insertion position, enables a direct and non-complex generation of the direction-dependent friction force. The friction unit has in particular several, in particular precisely two, in particular more than two, in particular at least three, in particular at least four and in particular at most twenty friction linings. The friction unit acts passively. By means of a friction lining carrier, which is in particular arranged in the housing, the extraction friction or the insertion friction can be generated by displacing it between an extraction position and an insertion position. By changing the friction lining carrier between the extraction position and the insertion position, the arrangement of the at least one friction lining relative to the tappet is also changed. As a result, in particular the amount of the friction force changes in dependence on the displacement direction of the tappet and in particular the resulting change in position of the friction lining carrier.

The switching unit serves in particular for the switchable locking of the friction lining carrier, in particular in the extraction position and/or in the insertion position. The displaceability of the friction lining carrier in the insertion direction and/or extraction direction is blocked by the locking. In the extreme positions of the friction lining carrier, the arrangement of the at least one friction lining relative to the tappet is determined independently of the displacement direction of the tappet. In the blocked arrangement of the friction lining carrier, the extraction friction and the insertion friction are identical in terms of amount.

In particular, the friction unit interacts with the tappet in such a manner that the friction lining carrier is moved to the extraction position when the tappet is moved in the extraction direction and to the insertion position when the tappet is moved in the insertion direction. The displacement of the friction unit results directly from the displacement of the tappet, in particular by the friction force between the at least one friction lining and the tappet. The displacement of the friction unit is integrated into the typical actuation sequence of the friction damper.

An embodiment of the locking element in which it has at least one abutment surface with which the locking element in the locked arrangement abuts against at least one locking surface of the friction lining carrier ensures an efficient setting of the friction force. In particular, the locking element is in direct contact with the friction lining carrier. In particular, the locking element can be moved into a spaced arrangement with respect to the friction lining carrier. In this spaced arrangement, the displaceability of the friction lining carrier is unimpeded. When the locking element is arranged without contact from the friction lining carrier, the friction lining carrier is unlocked. In this arrangement of the locking element, the friction unit generates the direction-dependent friction force. For the locked arrangement, the locking element has an abutment surface with which the locking element abuts against a locking surface of the friction lining carrier.

An embodiment of the locking element in which it is configured as a linearly displaceable sliding element, in particular in a direction perpendicular to the tilt axis, is non-complex and robust. In particular, the actuation of the locking element and/or the interaction of the locking element with the friction lining carrier is non-complex and mechanically robust.

A recess of the locking element for collision-free displacement of the locking element along the longitudinal axis simplifies the locking of the friction lining carrier. The friction lining carrier can be arranged in and/or on the recess of the locking element. The locking element can be moved along the longitudinal axis in a collision-free manner with respect to the friction lining carrier. A friction damper of this type enables a compact and robust, in particular space-saving construction. The recess is in particular designed as an opening, in particular as a through-opening. The recess and in particular the through-opening have a base surface which is oriented in particular parallel to the longitudinal axis and parallel to the tilting axis. The recess, in particular the through-opening, extends on the locking element, in particular starting from an underside facing the friction lining carrier, along an extension direction that is oriented perpendicularly to the base surface. The extension direction is oriented in particular perpendicularly to the longitudinal axis and perpendicularly to the tilting axis. It is also conceivable that the recess does not extend entirely through the locking element. The recess can also extend from a side surface of the locking element, in particular along the tilting axis. In particular, it is conceivable that recesses are provided on both sides of the locking element so that the friction lining carrier engages around the locking element in a tab-like manner and is guided past the locking element.

An embodiment of the actuator as an electric motor, in particular as a DC motor, enables a small-scale implementation of the switching unit. The friction damper has a reduced overall weight, in particular electronic actuation and/or the controllability of the switching unit is simplified.

The actuator is switched by current and moved into a position so that the locking element locks the friction lining carrier in a minimum position with minimum direction-independent friction force. The actuator can also be actuated such that one or more intermediate positions of the friction lining carrier are locked in which a force greater than the minimum friction force prevails. The actuator is actuated in order to change the friction force variably in a targeted manner.

A gear, in particular a reduction gear, comprised in the force transmission unit, enables a reduced drive power for moving the locking element. The gear is in particular a reduction gear. In particular, there is a reduction from the actuator to the threaded spindle. The actuator may in particular have a drive pinion on the motor shaft, which interacts with an internal toothing on the gear spindle. The internal toothing is in particular integrally designed in a sleeve section of the threaded spindle and is in particular firmly coupled to the movement thread of the threaded spindle.

An embodiment of the locking element in which it has a spindle nut that interacts with the threaded spindle enables an advantageous interaction between the locking element and the threaded spindle. A rotation of the threaded spindle automatically causes a linear displacement of the locking element. Due to the fact that the locking element has a spindle nut, which in particular is integrally designed on the locking element, the transmission of force is particularly robust.

An embodiment of the threaded spindle with self-locking is non-complex. The number of parts for the friction damper is reduced. In case of failure of the electrical power supply, in particular for the actuator, the locking element remains in its current position due to self-holding.

Self-holding is also referred to as self-locking. The self-locking of the threaded spindle is essentially determined by the pitch angle of the movement thread of the threaded spindle. The smaller the pitch angle is designed, the greater the tendency for self-locking. In particular, the pitch angle depends on the type of thread, for example a trapezoidal thread or a metric thread.

In particular, the pitch angle is smaller than the friction angle of the material pairing of threaded spindle and corresponding spindle nut. To move the locking element, in particular the actuator must be energized in both directions. To support switching to the extreme position with maximum friction force, at least one force storage element can be provided.

In the respective locking positions, a permanent current supply to the actuator can be omitted. The electrical drive power required for switching is low. The fail-safe function is implemented via an electronic circuit and corresponding electrical energy storage elements, in particular capacitors.

Due to self-holding, the energy consumption is reduced because the current supply to the actuator can be reduced or deactivated when the actuator with the locking element is in the minimum position or an intermediate position.

Alternatively, the threaded spindle can be designed without self-locking. In particular, a threaded spindle is configured without self-locking if the pitch angle of the movement thread is greater than the friction angle of the material pairing of threaded spindle and spindle nut. In this case, current only needs to be applied to the actuator in one direction, in particular in the direction towards the minimum friction force position. Support in the opposite direction, i.e. in the direction of a maximum friction force position, is possible but not mandatory. To hold the locking element in the minimum position, the actuator must be permanently energized. When the voltage is removed, the locking element and thus the friction lining carrier is automatically moved back to the maximum position, in particular by the at least one mechanical force storage element.

A failsafe unit for a failsafe function of the friction damper for placing the locking element in a locked arrangement on the friction lining carrier in such a manner that a maximum direction-independent friction force is effective ensures reliable and in particular damage-free and/or non-destructive operation of the friction damper in the event of an unintentional malfunction. Such a malfunction is in particular present if the switchable actuator is unintentionally deactivated. For example, the actuator is unintentionally deactivated if the power supply is unintentionally interrupted, for example in the event of a power failure. Switching the actuator is then no longer possible. The failsafe unit ensures that the locking element is reliably moved to a position in which the friction damper has a maximum friction effect. This position is called the maximum position.

In particular, the gear can be designed such that an unintentional shifting back of the locking element, in particular into an initial position, is prevented. In such an embodiment, the friction damper has a so-called failsafe function.

In particular, if the threaded spindle is configured without self-locking, the failsafe unit has in particular at least one force storage element, in particular two or more force storage elements, which is configured in particular as a mechanical spring, in particular as a helical compression spring. The at least one force storage element is arranged between the locking element and the housing and is supported in the axial direction. The at least one force storage element simplifies the shifting of the locking element back into an initial position. In particular, several, in particular precisely two, force storage elements are provided. The force storage elements are in particular arranged on both sides of the threaded spindle and in particular diametrically in an opposite position with respect to the threaded spindle. The at least one force storage element is oriented in particular parallel to the longitudinal axis of the housing and is arranged in the axial direction between the locking element and the housing. The at least one force storage element is designed in particular as a compression spring, in particular in the form of a helical spring.

A spring force, i.e. a total spring energy, is impressed on the at least one force storage element by axial compression. The force storage element is an energy storage. The energy storage provides an amount of energy that is required for the backward displacement of the locking element for ensuring the failsafe function, in particular also in the event of an unexpected interruption of the power supply.

When the actuator is deactivated, i.e. the power supply is terminated, the locking element and in particular thus the friction lining carrier is moved to the maximum position as a result of the spring force and/or the inherent pivoting movement of the friction lining carrier. In this case, the maximum friction force is effective. When the actuator is actuated with an increased voltage, the locking element is displaced into a minimum position or intermediate position against the spring force, and the friction lining carrier is locked in the respective position, in particular in the minimum position. In this intermediate or minimum position, a friction force acts which is reduced compared to the maximum friction force and in particular is minimal. This makes it possible to set a reduced, in particular minimal, friction force in a targeted manner.

The displacement of the locking element into the minimum position takes place against the spring force of the at least one force storage element. As a result, a counterforce is impressed in the force storage element, which counteracts the displacement and arrangement of the locking element in the minimum position.

Due to the impressed counterforce of the force storage element, the locking element is moved out of the minimum position or an intermediate position, in particular into the maximum position, in particular automatically when the actuator is deactivated, in particular by interrupting the power supply. In particular, the counterforce exerted by the force storage element is dimensioned such that it reliably moves the locking element and the actuator back to the maximum position. In particular, the at least one force storage element ensures a reliable displacement of the locking element with the actuator to the maximum position in case of an unintentional power failure. The failsafe unit ensures a so-called failsafe operation of the friction damper. It is excluded that the friction damper is unintentionally operated with reduced and in particular with minimal friction force in case of power failure. Damage and/or destruction to the components to be damped are excluded.

If the threaded spindle is designed to be self-locking, the failsafe unit is configured in particular by an electrical energy store, in particular a capacitor, and/or an electrical circuit. The electrical circuit can generate a corresponding switching signal to move the actuator back to the maximum position, in particular also when the power supply is disconnected. Accordingly, the energy required for the displacement of the locking element can be provided by the electrical energy storage, in particular the capacitor.

In the case of self-holding, an additional electrical energy storage is used to provide electrical energy for triggering the switching process to the maximum position. The electrical energy storage can be implemented by one or more capacitors. The electrical energy storage provides a current pulse for a switching operation which serves to release the self-holding of the actuator. The further displacement of the actuator back into the maximum position can take place automatically and in particular be supported by at least one force storage element, in particular a mechanical spring and the counterforce impressed therein. The counterforce depends on the design of the energy storage used. In order to ensure the "failsafe function" during self-holding, the control device is provided which can supply the necessary current pulse for the switching operation in the event of a power failure.

In particular, the friction damper has a control device which is used in particular for controlling the actuator, i.e. in particular for the controlled current supply to the actuator. With the control device, the failsafe function can be advantageously implemented and in particular reliably guaranteed. However, the control device can also be provided if the friction damper does not have a failsafe function.

The control device has in particular at least one or more electrical components, in particular electromechanical components, in particular electromechanical switches, in particular relays, and/or electronic components, in particular electronic switching components, in particular transistors. When mains voltage is applied, the additional electrical energy storage is electrically charged. The connection of the electrical energy storage to the actuator is disconnected by means of the electrical component. In the event of a power failure, in particular an unintentional one, the electrical components ensure that the electrical energy storage is disconnected from the charging device, in particular the mains voltage, and connected to the actuator. For this purpose, the electrical switching components are in particular set up such that they connect the electrical energy storage to the actuator in the de-energized state.

In addition or alternatively, it is also possible to additionally use the electrical energy stored in the electrical energy storage for controlling the control device, in particular by means of transistors.

If the threaded spindle has proportional, in particular low, self-locking, the displacement of the locking element back into the maximum position can take place at least proportionally by means of the at least one force storage element. In addition, a reset energy can be provided by means of a corresponding electrical circuit and/or an electrical energy storage, in particular a capacitor, as is known in the case of a threaded spindle with self-locking. The advantage of a threaded spindle without self-locking is that a reduced holding voltage and thus a reduced energy requirement is necessary.

A friction damper with a threaded spindle that is not designed to be self-locking enables particularly advantageous operation, in particular stepped energizing of the actuator. It has been recognized in particular that a maximum voltage, in particular 12 V, is only required when a switching operation has to be carried out, i.e. the locking element is to be axially moved via the spindle nut. Such switching operations are comparatively rare in relation to the service life of the friction damper, so that the integral switching duration is comparatively short in relation to the service life of the friction damper. Accordingly, the maximum voltage must be tapped for a comparatively short duration. The actuator can be dimensioned to be small and/or cost-efficient.

To hold the spindle nut with the locking element in a set axial position, a comparatively lower holding voltage, in particular 3 V, is required. The holding voltage must essentially be provided permanently. Due to the fact that the holding voltage is significantly reduced compared to the maximum voltage, the total energy consumption for the operation of such a friction damper is reduced and thus advantageous.

Tilting the friction lining carrier about a tilting axis, wherein the tilting axis is arranged transversely with respect to the longitudinal axis, simplifies the change between the extraction position and the insertion position. The tilting axis is in particular arranged fixed to the housing. The tilting axis is oriented transversely and in particular perpendicularly to the longitudinal axis of the housing. In particular, the tilting axis is oriented substantially perpendicularly to the longitudinal axis 3, wherein angular deviations of +1-15° with respect to a perpendicular orientation to the longitudinal axis are conceivable for the tilting axis. In particular, a tilting pin is arranged in the housing, to which the friction lining carrier is hinged in a tiltable manner with a tilt opening. The tilting pin determines the tilting axis. The tiltability of the friction lining carrier is simplified. The friction lining carrier is also called a tilting piston.

In particular, the tilting axis is arranged at a distance from the longitudinal axis, in particular at a skew angle to the longitudinal axis. Due to the arrangement of the tilting axis at a distance from the longitudinal axis, tilting of the friction lining carrier, i.e. switching between the extraction position and the insertion position, is advantageously possible. In particular, a torque with respect to the tilting axis is directly exerted on the friction lining carrier depending on the actuation of the tappet in the insertion direction or in the extraction direction.

An embodiment of the friction lining carrier in which it has at least one friction lining receptacle in which the at least one friction lining is arranged, wherein in particular two friction linings are provided which in particular each have a half-shell contour, ensures a non-complex and reliable arrangement of the at least one friction lining in a friction lining receptacle provided therefor. In particular, at least one and in particular precisely one friction lining receptacle is provided for each friction lining. In particular, several, in particular two, friction lining receptacles are integrated in the friction lining carrier, wherein a friction lining is arranged in each friction lining receptacle.

In particular, two friction linings are present and enable improved, in particular more efficient, friction force generation. It is conceivable to make the friction linings identical. The manufacturing effort for the friction damper is reduced. The friction linings in particular have a contour that corresponds to the outer contour of the tappet. The friction linings can lie flat against the tappet, in particular over the entire surface. The friction force is generated efficiently. The friction linings in particular have a half-shell contour. The half-shell contour is an open tube cross-section. The inner contour of the half-shell is in particular an inner cylinder shell surface. It is also conceivable that the tappet has a cross-sectional surface that is oriented perpendicularly to the longitudinal axis and is of non-circular design, in particular oval or polygonal. In this case, the inner contour of the friction lining is designed accordingly. It is also conceivable that the friction lining is formed by one or more friction strips. A friction strip is essentially flat. The friction strip is in particular flexible, so that the friction strip assumes the contour corresponding to the tappet, in particular by insertion into the friction lining receptacle. In particular, the friction lining receptacle has a contour corresponding to the tappet.

An embodiment of the friction damper in which the friction lining carrier has a through-opening through which the tappet is guided, wherein the through-opening has a contour which is asymmetrical at least in sections perpendicularly to the longitudinal axis, enables efficient friction damping. The at least one friction lining can be arranged in a radial direction with respect to the longitudinal axis between the internally arranged tappet and the externally arranged friction lining carrier. In particular, the at least one friction lining is pressed against the tappet in the radial direction by the friction lining carrier. The friction lining carrier with a through-opening enables a compact design of the friction unit.

In particular, the through-opening has a contour that is asymmetrical perpendicular to the longitudinal axis, at least in sections, and enables advantageous switching between the extraction position and the insertion position. In particular, collision-free tilting of the friction lining carrier relative to the tappet between the extraction position and the insertion position is possible. A through opening of the friction lining carrier provides the free space required for switching between the extraction position and the insertion position. An asymmetrical contour of the through-opening is given, for example, by the fact that the contour has a division line. In particular, the through-opening has an asymmetrical inner contour. The asymmetrical inner contour can be symmetrical in sections and, for example, be designed as a segment of a circle. Symmetrical means rotationally symmetrical with respect to the longitudinal axis. The asymmetrical inner contour has at least one asymmetrical section, which is in particular designed to be non-circular. There can also be several asymmetrical sections, in particular designed separately from each other. It is essential that the asymmetrical inner contour is not rotationally symmetrical with respect to the longitudinal axis, at least in sections. In particular, asymmetrical means not rotationally symmetrical with respect to the longitudinal axis that is oriented perpendicularly to the contour. The division line is in particular a straight line which in particular intersects the longitudinal axis. The division line symbolizes a division plane which extends along the longitudinal axis. The division line can also be curved or bent. The division line divides the contour of the through-opening into a symmetrical, in particular circular contour section and an asymmetrical, in particular non-circular contour section. The division line separates the symmetrical contour section and the asymmetrical contour section from each other.

Additionally or alternatively, the through-opening may be configured with a first through-opening section and a second through-opening section, each having a section longitudinal axis which are arranged at an inclination angle to each other, thereby ensuring that the friction lining carrier is arranged with either a first or a second through-opening section parallel to the longitudinal axis of the housing, in dependence on the tilt position. The through-opening sections each have a section longitudinal axis which are arranged at an angle to one another. In particular, the section longitudinal axes are oriented such that in the extraction position of the friction lining carrier, a first section longitudinal axis is arranged to be parallel to the longitudinal axis of the housing and a second section longitudinal axis is arranged to be inclined to the longitudinal axis of the housing. Correspondingly, in the insertion position, the second section longitudinal axis is parallel to the longitudinal axis of the housing and the first section longitudinal axis is inclined to the longitudinal axis of the housing.

A friction lining receptacle configured as a depression in the through opening enables the friction lining to be reliably and safely received on the friction lining carrier. The friction lining is held in the friction lining receptacle in particular in the radial direction and/or in the axial direction with respect to the longitudinal axis of the housing and/or the section longitudinal axis. The friction lining receptacle in particular has a depth which is slightly smaller than the thickness of the friction lining, so that the friction lining is permanently pressed against the tappet in the radial direction. The friction lining receptacle has a length that is oriented along the longitudinal axis and corresponds approximately to the length of the friction lining. The friction lining is then reliably held in the friction lining receptacle without being axially preloaded. It is also conceivable to preload the friction lining in the axial direction by having the friction lining receptacle have a length that is smaller than the length of the friction lining.

An embodiment of the through-opening with a cross-section that is oriented perpendicularly to the longitudinal axis and is variable along the longitudinal axis ensures that, in dependence on the tilt position of the friction lining carrier, reliable abutment of the friction lining on the tappet is ensured, at least in sections.

Fastening elements on the friction damper, wherein a first fastening element is arranged in particular on the housing and a second fastening element is arranged in particular on the tappet for fastening to parts which are movable relative to one another, enable direct fastening of the friction damper to mutually movable parts, in particular a washing tub and a housing of a washing machine.

A sensor unit with a displacement sensor and a corresponding displacement transducer, the axial position of which with respect to the longitudinal axis is detected by means of the sensor unit, wherein the displacement transducer is held in particular on the tappet, enables improved signal acquisition for the operation of the friction damper. The displacement transducer is in particular a magnetic displacement sensor. A washing machine that is equipped with such a friction damper enables improved functionality, in particular the determination of the load quantity and/or monitoring and control of a spin cycle. In particular, the sensor unit and/or the displacement transducer are arranged to be integrated in the friction damper. The friction damper is configured to be compact and robust.

Both the features indicated above and the features indicated in the following embodiment example of the friction damper according to the invention are each suitable, on their own or in combination with each other, to further embody the subject-matter according to the invention. The respective combinations of features do not represent any restriction with regard to the further development of the subject-matter of the invention, but are essentially merely exemplary in character.

Further features, advantages and details of the invention will be apparent from the following description of an embodiment example based on the drawing.

DESCRIPTION OF THE PREFERRED EMBODIMENT

Figure 1:
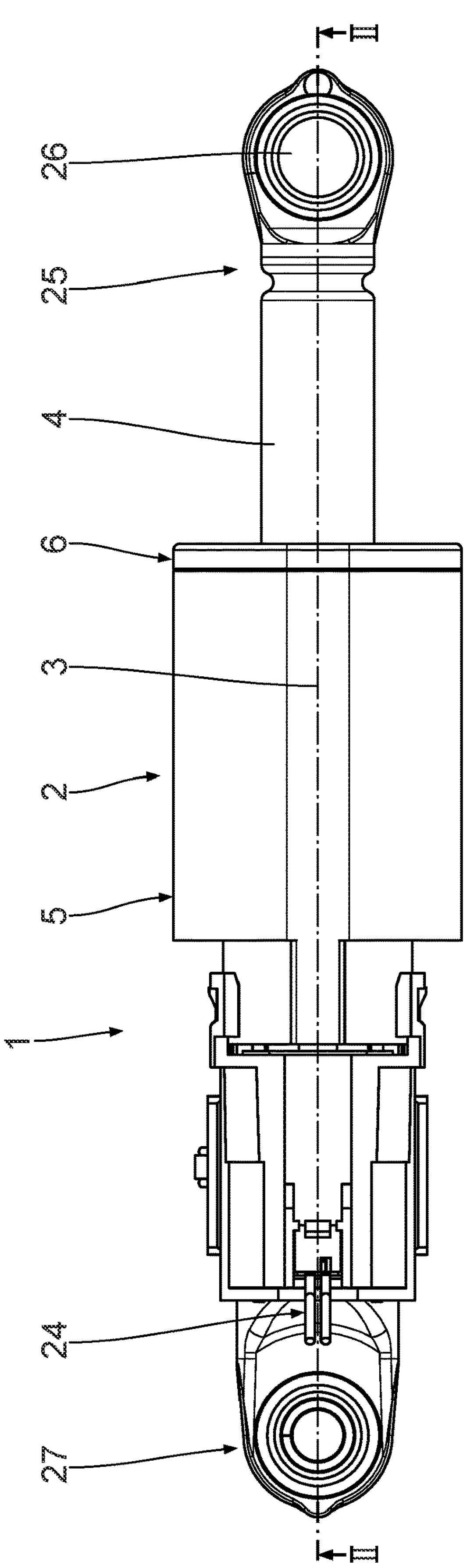
FIG. 1 shows a side view of a friction damper according to the invention.
Figure 2:
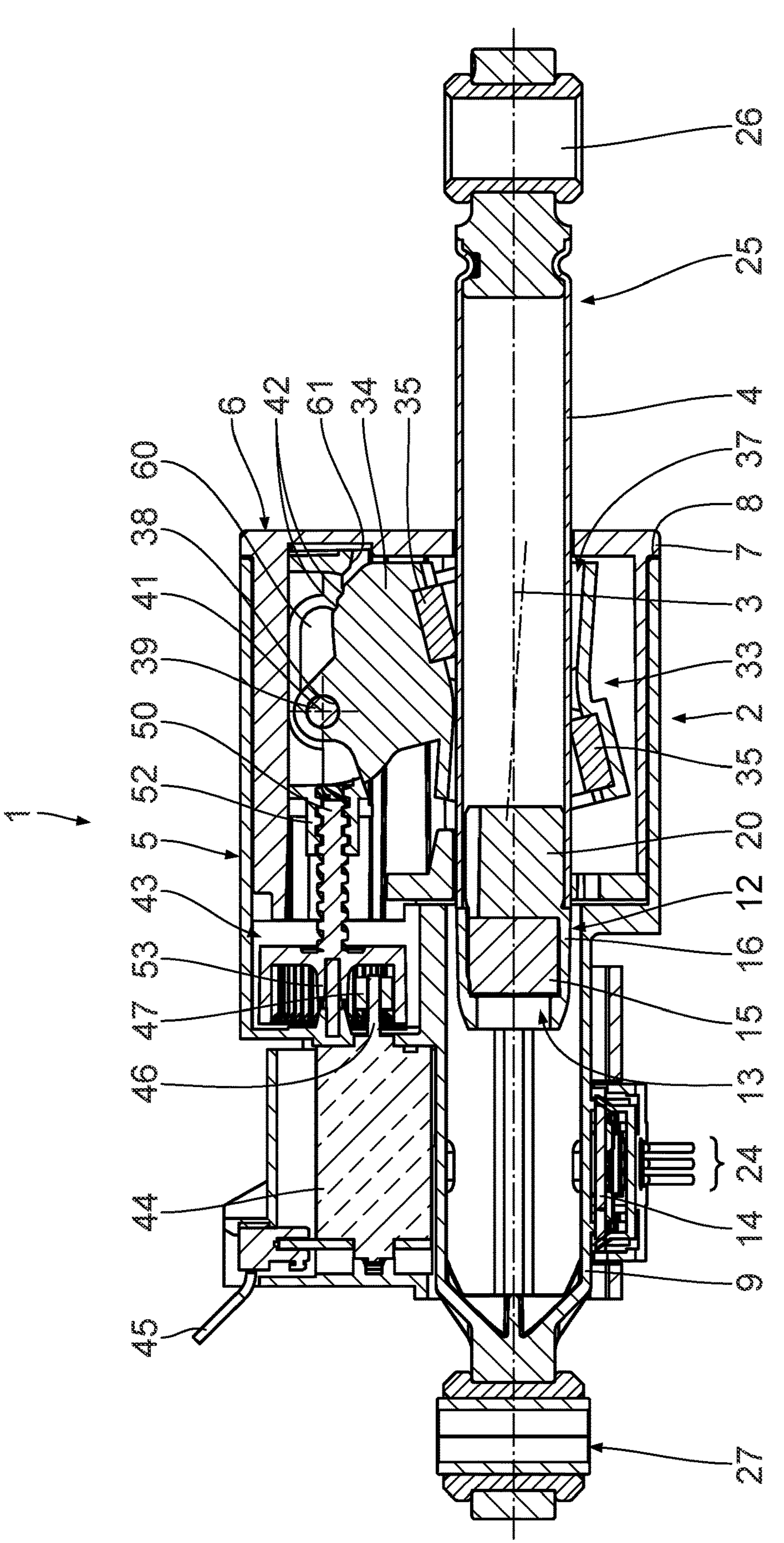
FIG. 2 shows a sectional illustration according to section line II-II in FIG. 1 with the friction lining carrier locked in the minimum position.
Figure 3:
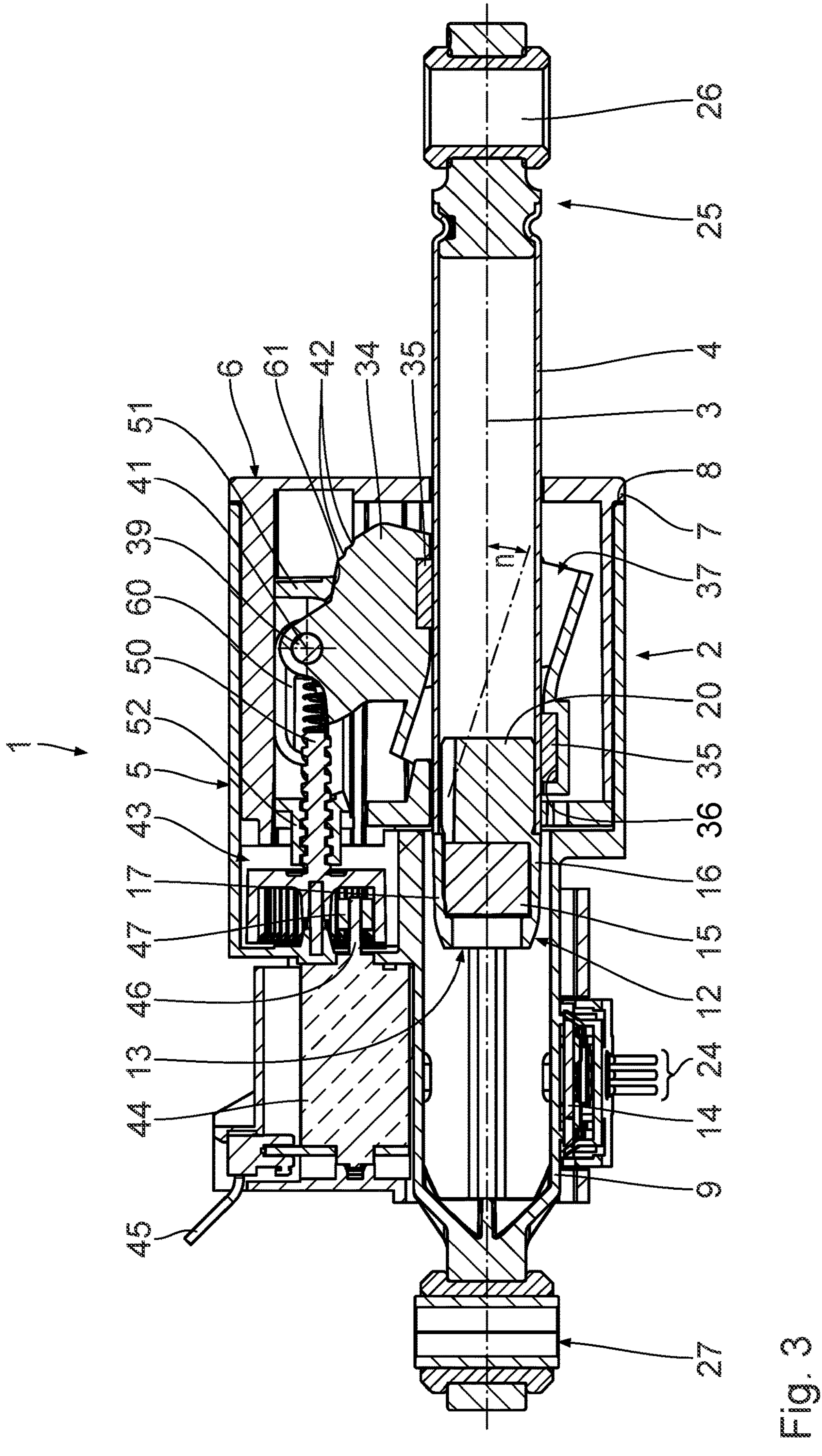
FIG. 3 shows a view corresponding to FIG. 2 with the friction lining carrier locked in a maximum position with a maximum direction-independent friction force.
Figure 4:
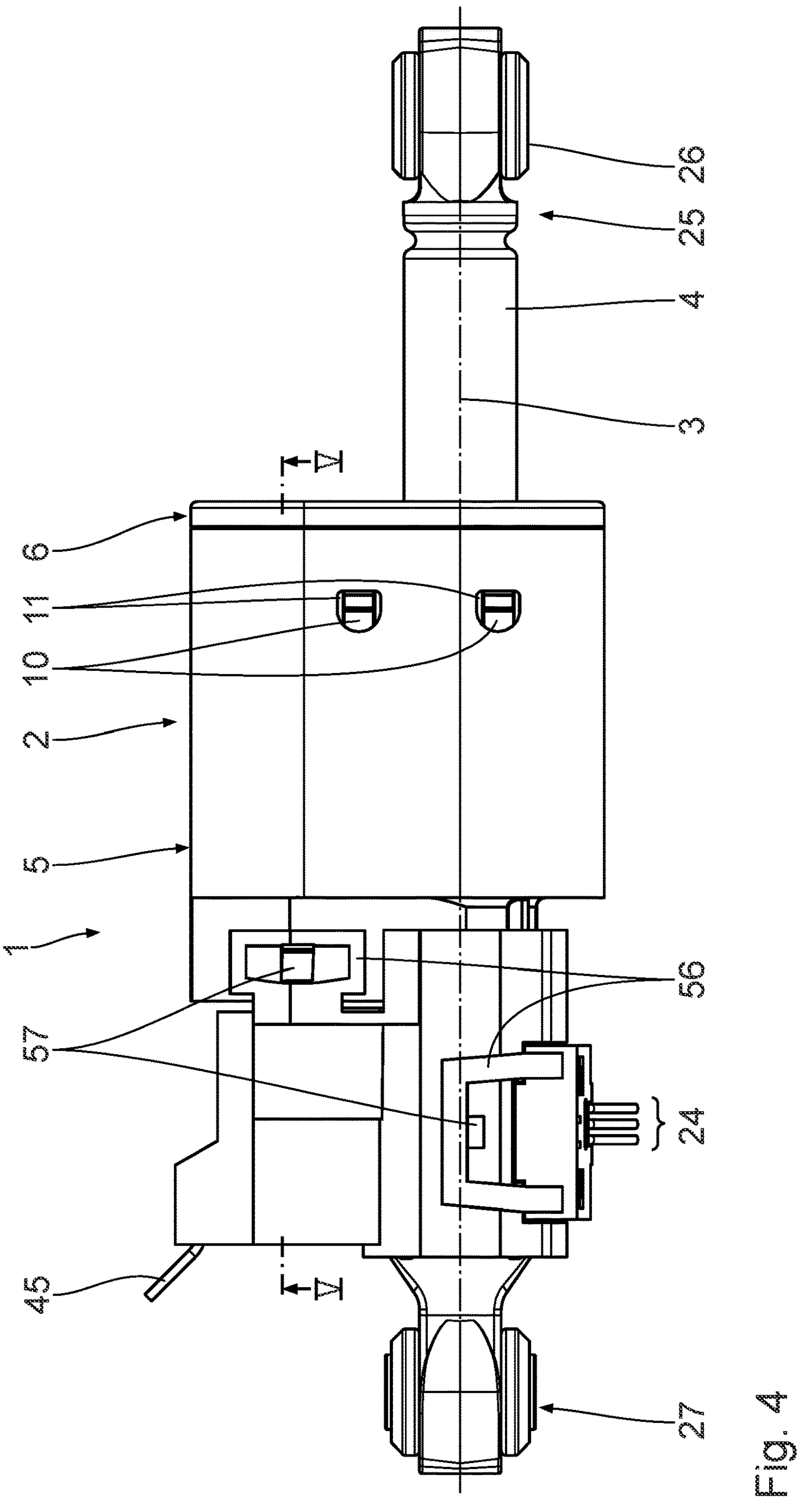
FIG. 4 shows a side view of the friction damper corresponding to FIG. 1 rotated by 90° with respect to the longitudinal axis
Figure 5:
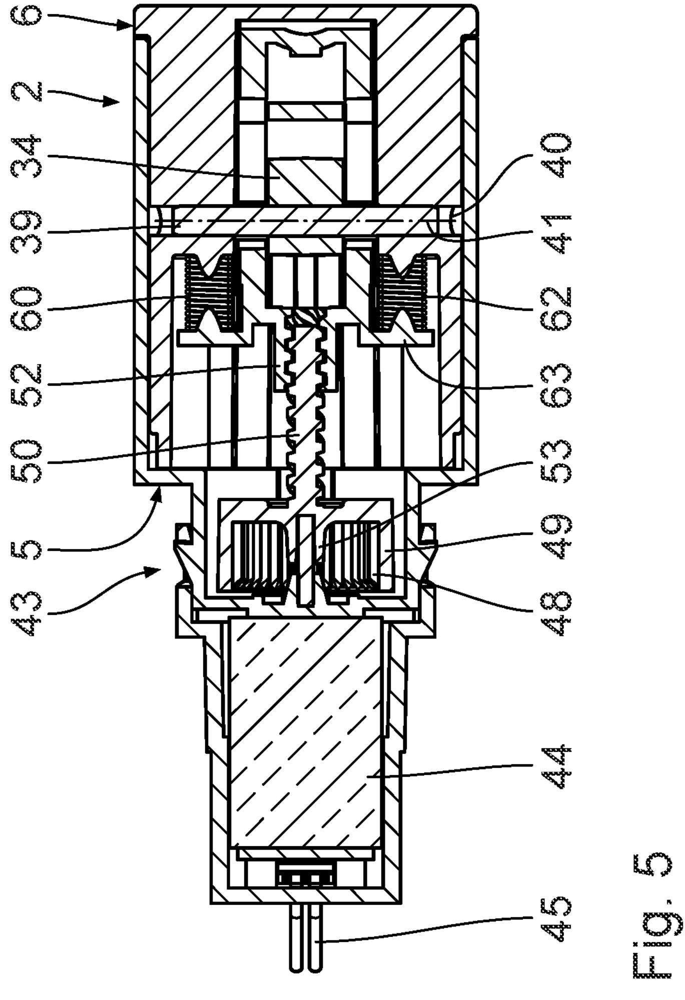
FIG. 5 shows a sectional illustration according to section line V-V in FIG. 4 with the friction lining carrier locked in the minimum position.
Figure 6:
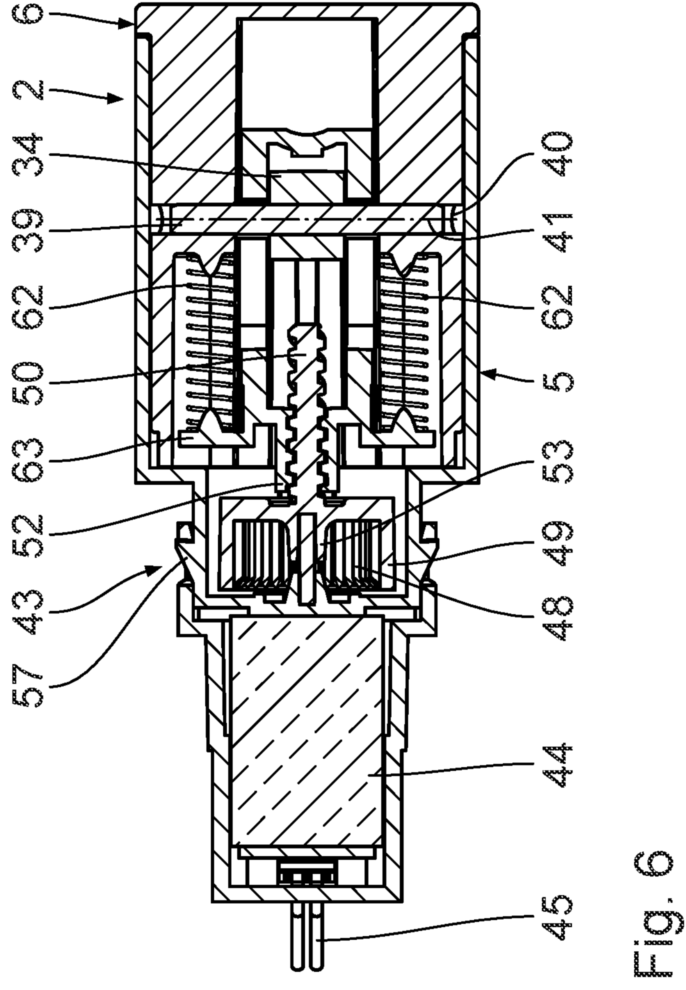
FIG. 6 shows an illustration corresponding to FIG. 5 with the friction lining carrier locked in the maximum position according to FIG. 3.
Figure 7:
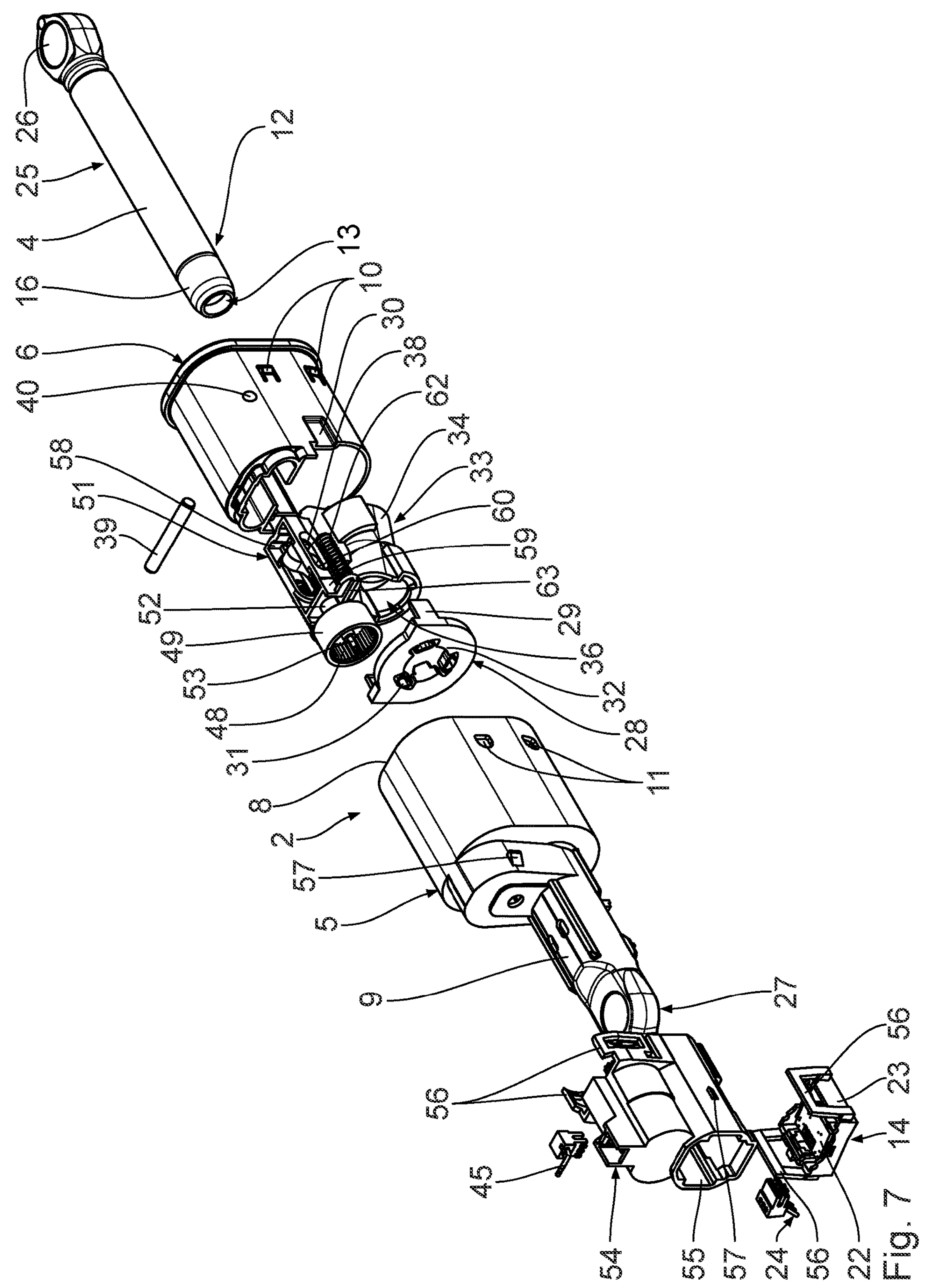
FIG. 7 shows a perspective exploded view of the friction damper.

A friction damper referred to as a whole as 1 in FIGS. 1 to 7 has a housing 2 with a longitudinal axis 3 and a tappet 4 that can be moved along the longitudinal axis 3.

The housing 2 is configured in several parts and in particular comprises a tube housing section 5 and a damping housing section 6 connected thereto. The housing 2 has a housing opening through which the tappet 4 is guided into the housing 2, in particular through the damping housing section 6 into the tube housing section 5. At an end facing away from the damping housing section 6, the tube housing section 5 has a first fastening element 27 in the form of a fastening eye. The damping housing section 6 is inserted into the tube housing section 5 along the longitudinal axis 3, supported axially by means of a radial collar 7 on an end face 8 of the tube housing section 5 and fixed axially in the tube housing section 5, in particular by means of a snap-in connection not shown in greater detail.

The tube housing section 5 has, at least in sections along the longitudinal axis 3, a tube section 9 whose inner contour corresponds to the outer contour of the tappet. The inner contour of the tube section 9 is larger than the outer contour of the tappet 4, so that the tappet 4 can be moved axially along the longitudinal axis 3 in the tube section 9 without contact. Contact between the outer contour of the tappet 4 and the inner contour of the tube section 9 is avoided.

The tappet 4 is tubular and in particular substantially cylindrical. According to the shown embodiment example, the tube section 9 is configured to be hollow-cylindrical. Corresponding to the outer contour of the tappet 4, the inner contour of the tube section 9 can also be configured to be non-circular, in particular oval or polygonal, in particular square, hexagonal or octagonal. It is essential that the outer contour of the tappet 4 is constant along the longitudinal axis 3. The tube section 9 of the tube housing section 5 is oriented concentrically with respect to the longitudinal axis 3. The tube housing section 5 and the damper housing section 6 are each in particular made in one piece. The housing sections 5, 6 are in particular made of a plastic material, in particular a thermoplastic plastic material.

A displacement transducer 13 is fastened to a first end 12, with which the tappet 4 is arranged inside the housing 2. A sensor unit 14 corresponds to the displacement transducer 13. The displacement transducer 13 comprises a cylindrical permanent magnet 15 which is held on the tappet 4 by means of a magnet holder 16 made of plastic material. The magnet holder 16 has a magnet receptacle into which the permanent magnet 15 can be inserted at the end face. The magnet receptacle is configured to be sleeve-shaped. The permanent magnet 15 is held axially reliably in the magnet receptacle.

At an end opposite the magnet receptacle, the magnet holder 16 has a fastening section 20 with which the magnet holder 16 can be slid axially onto the tappet 4 and fastened therein.

A particular advantage of the displacement transducer 13 is that it can be connected to the tappet 4 as an option, in particular at a later time. In particular, it is possible to retrofit a tappet 4 without displacement transducer with the displacement transducer 13 without any problems.

The sensor unit 14 comprises a magnetic displacement sensor 22 which is suitable for detecting the position of the permanent magnet 15 and thus of the tappet 4 relative to the housing 2. The magnetic displacement sensor 22 is firmly fastened to the housing 2 and in particular to the tube housing section 5 and in particular to the tube section 9, by means of a sensor holder 23. The magnetic displacement sensor 22 generates a control signal which can be transmitted via a first signal line 24 to a control unit that is not shown in greater detail. It is also conceivable that the signal transmission takes place wirelessly.

To improve the sensor measuring range in connection with the mechanical stroke of the friction damper 1, it is advantageous if the tappet 4 is made of a non-ferromagnetic material, in particular plastic.

In particular, the tappet 4 and the magnet holder 16 may be made in one piece, in particular of plastic. In particular, a second fastening element 26 can also be made in one piece with the tappet 4.

The displacement signal measured with the sensor unit 14 can in particular be used to control a washing programme of a washing machine to determine the load quantity and/or to monitor and control a spin cycle in a washing machine.

At a second end 25 opposite the first end 12, the tappet 4 has a second fastening element 26, which is configured as a fastening eye. The second fastening element 26 is in particular inserted with a connecting section into the end face of the sliding tube of the tappet 4 and fastened therein, in particular connected by compression moulding. Joining methods such as bonding or welding are also possible. The second end 25 of the tappet 4 is arranged with the second fastening element 26 outside the housing 2.

The friction damper 1 can be hinged with the fastening elements 26, 27 to mutually movable parts to be damped. For example, for damping oscillations of a washing machine, the fastening elements 26, 27 are connected to the housing of the washing machine on the one hand and to the washing tub of the washing machine on the other hand.

A support disc 28 is arranged on the damping housing section 6 on a front side facing the tube housing section 5. The support disc 28 has two axial guide fingers 29 which engage in corresponding recesses 30 on an outer side of the damper housing section 6. The support disc 28 is distinctly and reliably positioned and held on the damper housing section 6.

The support disc 28 has a through-opening. Several, in particular three, damping elements 31 and guide webs 32 are arranged at the through-opening. The supporting disc 28 forms a guiding/damping unit for damping and centring a deflection of the tappet 4 transversely to the longitudinal axis 3. Such a guiding/damping unit is known from EP 1 584 730 A2. With regard to construction and function, in particular of the damping elements 31 and the guide webs 32, express reference is made thereto.

It has been recognized to be particularly advantageous in the case of the support disc 28 that exactly three damping elements 31 and exactly three guide webs 32 are provided, wherein precisely one guide web 32 is arranged in each case between two damping elements 31 that are arranged adjacent to one another in the circumferential direction. Due to this alternating arrangement, the damping elements 31 and the guide webs 32 are each arranged with an opening angle of 120° with respect to the longitudinal axis 3. In particular, the guiding/damping function is direction-independent with respect to a radial deflection. This means in particular that the radial guiding/damping function of the support disc 28 is independent of the installation position of the damper 1 in the washing machine. The friction damper 1 can be used flexibly. Mounting the friction damper is simplified and non-complex.

The friction damper 1 has a friction unit 33. The friction unit 33 comprises a friction lining carrier 34, on which two friction linings 35, in particular of identical design, each in the form of a half shell, are held. The friction linings 35 are each arranged in a friction lining receptacle 36, which is designed as a depression, in particular a radial depression, in an inner surface of a through-opening 37 of the friction lining carrier 34.

In the mounted state of the friction damper 1, the tappet 4 is guided through the through-opening 37. The through-opening 37 is configured to be at least sectionally asymmetrical in a plane perpendicular to the longitudinal axis 3. The through-opening 37 has a first through-opening section with a first section longitudinal axis and a second through-opening section with a second section longitudinal axis. The section longitudinal axes are arranged at an angle of inclination n to each other. The angle of inclination is in particular between 5° and 60° and in particular between 15° and 45°. The friction lining receptacles 36 are each arranged as groove-shaped depressions in the region of the through-opening 37. The through-opening 37 is defined by a substantially tubular through-opening section of the friction lining carrier 34. Outside the through-opening section, in particular at a distance from the through-opening 37, the friction lining carrier 34 has a pivot section in which a pivot opening 38 is arranged. The pivot opening 38 serves for the pivotable arrangement of the friction lining carrier 34 in the housing 2. For this purpose, the friction lining carrier 34 is pivotably arranged in the housing 2 with a bolt-like connection element 39. The connection element 39 is a connection bolt. The connection element 39 can be inserted transversely through a side opening 40 in the damper housing section 6 for mounting the friction lining carrier 34. Unintentional displacement of the connection bolt 39 out of the side opening 40 is reliably excluded when the damper housing section 6 is inserted into the tube housing section 5. The connection element 39 is then blocked in its position by the tube housing section 5.

The connection element 39 defines a tilting axis 41 about which the friction lining carrier 34 is arranged on the connection element 39 and thus tiltable relative to the housing 2. The tilting axis 41 is oriented perpendicularly to the longitudinal axis 3 of the housing 2. The tilting axis 41 is oriented at a distance from the longitudinal axis 3. The tilting axis 29 and the longitudinal axis 3 do not intersect. The positional relationship of the tilting axis 41 and the longitudinal axis 3 in space is referred to as being skew.

The friction lining carrier 34 has at least one and in particular several locking surfaces 42 on an outer side facing away from the through-opening 37. The locking surfaces 42 are in particular configured in the form of steps or stairs. In particular, the locking surfaces 42 are arranged adjacent to one another on the outer side of the friction lining carrier 3

The friction lining carrier 34 is arranged entirely within the housing 2 and in particular entirely within the damping housing section 6. In particular, the friction lining carrier 34 is arranged in the housing 2 in such a manner that the through-opening 37 is oriented in alignment with the longitudinal axis 3.

The friction damper 1 has a switching unit 43. The switching unit 43 comprises a switchable actuator 44, which is designed as an electric motor and in particular as a DC motor. The actuator 44 is held on the housing 2 by means of an actuator holder 54. The actuator holder 54 has in particular a sliding sleeve section 55 which can be slid onto the tube section 9 of the housing 2. The actuator holder 54 can latch with two laterally arranged latching tabs 56 on corresponding elevations 57 on an outer side of the housing 2, in particular of the tube housing section 5. Corresponding elevations 57 are arranged on an outer side of the actuator holder 54, onto which corresponding latching tabs 56 of the sensor holder 23 can be latched and locked.

To operate the actuator 44, it is connected to a connecting cable 45 by means of a plug. A drive pinion 47 is fastened to a drive shaft 46 of the electric motor 44. The drive pinion 47 interacts with an internal toothing 48 in a cup element 49. The drive pinion 47 and the internal toothing 48 form a gear, in particular a reduction gear. The cup element 49 has a cup bottom which is arranged facing away from the drive pinion 47. A threaded spindle is arranged on the cup bottom and in particular fastened to the cup bottom. In particular, the threaded spindle 50 is formed on the cup element 49 in one piece. The threaded spindle 50 and the gear form a force transmission unit for transmitting the drive torque from the actuator 44 to a locking element 51. The locking element 51 is part of the switching unit 43. By means of the force transmission unit, the locking element 51 is mechanically coupled to the actuator 44. The locking element 51 has a spindle nut 52 that interacts with the threaded spindle 50 and is fastened to the locking element 51, in particular integrally formed thereon.

The rotary drive movement provided by the actuator 44 is converted into a linear movement of the locking element 51 by means of the threaded spindle 50 and the spindle nut 52. The displacement direction is oriented to be parallel to the longitudinal axis 3.

The cup element 49 is axially supported on a face wall of the housing 2, in particular of the tube housing section 5, by means of a guide pin 53. The cup element 49 is rotatably mounted on the housing 2 by means of the guide pin 53.

The locking element 51 is essentially configured to be frame-like and in particular in the form of a rectangular frame. The main directions of the rectangle each extend in a direction parallel to the longitudinal axis 3 and parallel to the tilting axis 41.

The locking element 51 is configured as a slider. The rectangular frame encloses an opening 58 in a direction perpendicular to the rectangular plane of the frame. The friction lining carrier 34 is guided through the opening 58 in the mounted arrangement of the friction damper 1. In particular, the pivot section of the friction lining carrier 34 is guided through the opening 58.

The side walls 59 of the rectangular frame that extend parallel to the longitudinal axis 3 each have a guiding oblong hole 60 through which the connecting bolt 39 is guided in the assembled arrangement of the friction damper 1. The guiding oblong hole 60 allows an axial displacement of the locking element 51 in a direction parallel to the longitudinal axis 3.

At its rear end, the locking element 51 has an abutment surface 61 which is arranged facing the friction lining carrier 34 and in particular its locking surfaces 42. In particular, the abutment surface 61 serves to abut against one of the locking surfaces 42.

The friction damper 1 is designed with a failsafe unit comprising two force storage elements 62, each of which is designed as a helical compression spring according to the embodiment example shown. The force storage elements 62 are supported between the locking element 51 and the damper housing section 6. In an arrangement shown in FIG. 3 and FIG. 6, the force storage elements 62 are arranged with maximum decompression and in particular with minimum preload. By moving the locking element 41 into the arrangement shown in FIGS. 2 and 5, the force storage elements 62 are compressed. This imprints a higher spring force in the force storage elements 62.

In particular, the two force storage elements 62 are arranged laterally next to the rectangular frame of the locking element 51. For this purpose, the locking element 51 has lateral pressure plates 63 which are provided for applying the pressure force to the force storage elements 62. With regard to the basic function of the friction damper 1 in terms of direction-dependence and with regard to the lockability of the friction lining carrier 34 in the housing 2, express reference is made to EP 3 869 062 A1.

Supplementing this, it should be noted for the embodiment example shown here that a particularly robust and compact construction is made possible, which enables efficient force transmission from the actuator 44 by means of the gear and the threaded spindle 50 to the locking element 51. An adjustment of the locking element 51 and thus a targeted locking of the tiltable friction lining carrier is possible in a non-complex and reliable manner, in which the locking element 51 can be arranged with the abutment surface 61 either at a distance from the friction lining carrier 34, in order to enable a free pivotability of the friction lining carrier 34 in the housing 2. Alternatively, the locking element 51 may be displaced such that the abutment surface 61 abuts one of the locking surfaces 42 and allows a locked arrangement in a desired pivot position of the friction lining carrier 34. In a locked position, shown for example in FIG. 3, pivotability of the friction lining carrier 34 is prevented. In this arrangement, the friction damper 1 has constant, i.e. direction-independent, damping properties.

According to the embodiment example shown, the threaded spindle 50 is not self-locking. As soon as the power supply to the actuator 44 is interrupted, the locking element 51 is moved to the arrangement shown in FIG. 3. The reason for this is the spring force impressed in the force storage elements 62, which pushes the locking element 51, in particular the pressure plates 63 away from the side opening 40 with the connection element 39. In the arrangement shown in FIGS. 3 and 6, the friction damper 1 has a maximum friction effect so that even if the power supply is unintentionally interrupted, the friction damper 1 is transferred into a locking state, in particular automatically.

In summary, the structure of the friction damper 1 can be functionally summarized on the basis of its assembly in such a manner that first the damper housing section 6 is pre-assembled with the friction unit 33 comprising the friction lining carrier 34, the locking element 51, the force storage elements 62, the support disc 28 referred to as the insert ring and the bolt-like connection element 39.

A tube assembly is formed by the tappet 4, the magnet holder 16 holding the permanent magnet 15 and the second fastening element 26. A pre-assembly is formed from the first assembly and the tube assembly, which is mounted in the tube housing section 5, thereby forming a so-called base damper. The tube housing section 5 is in particular configured as a single piece.

A motor assembly comprises the sliding sleeve section 55, the actuator 44 and the sensor holder 23 with the magnetic displacement sensor 22 held therein. Finally, the motor assembly is mounted on the base damper.

Alternatively, it is conceivable to design the threaded spindle with self-locking. In this case, it is dispensable to energize the actuator 44 if the friction damper is arranged in a freewheel arrangement according to FIGS. 2 and 5, in which there is a minimum or no friction effect. In order to ensure a transfer to a safety state, the switching back to the state of maximum friction effect can be made possible by an electrical switching operation, which is carried out in particular by providing an electrical energy reserve in an electrical storage element, in particular in a capacitor.

What is claimed is:

1. A friction damper comprising a. a housing having a longitudinal axis, b. a tappet that is displaceable along the longitudinal axis, c. a friction unit for generating a direction-dependent friction force on the tappet, wherein the friction unit comprises at least one friction lining that rests frictionally on the tappet and a friction lining carrier on which the at least one friction lining is held, wherein the friction lining carrier is arranged to be displaced relative to the tappet between an extraction position and an insertion position, d. a switching unit for variably setting the friction force, wherein the switching unit comprises i. a switchable actuator, ii. a locking element, wherein the locking element has a spindle nut that interacts with a threaded spindle, wherein the spindle nut is integrally designed on the locking element, iii. a force transmission unit which is mechanically coupled to the actuator and to the locking element, wherein the force transmission unit comprises the threaded spindle.

2. The friction damper according to claim 1, wherein the friction lining carrier has at least one friction lining receptacle in which the at least one friction lining is arranged.

3. The friction damper according to claim 2, wherein two friction linings are provided.

4. The friction damper according to claim 3, wherein the two friction linings each have a half-shell contour.

5. The friction damper according to claim 1, wherein the friction damper has a first fastening element and a second fastening element for fastening to parts which are movable relative to one another.

6. The friction damper according to claim 5, wherein the first fastening element is arranged on the housing.

7. The friction damper according to claim 5, wherein the second fastening element is arranged on the tappet.

8. The friction damper according to claim 1, wherein the locking element is configured as a linearly displaceable sliding element.

9. The friction damper according to claim 8, wherein the locking element is slidable in a direction perpendicular to the tilting axis.

10. The friction damper according to claim 1, wherein the actuator is configured as an electric motor.

11. The friction damper according to claim 10, wherein the electric motor is configured as a DC motor.

12. The friction damper according to claim 1, wherein the locking element has at least one abutment surface with which the locking element in the locked arrangement abuts against at least one locking surface of the friction lining carrier.

13. The friction damper according to claim 1, wherein the locking element has an opening for collision-free displacement of the locking element along the longitudinal axis.

14. The friction damper according to claim 1, wherein the threaded spindle is configured with self-locking.

15. The friction damper according to claim 1, wherein the threaded spindle is configured without self-locking.

16. The friction damper according to claim 1, comprising a failsafe unit for a failsafe function of the friction damper for placing the locking element in a locked arrangement on the friction lining carrier in such a manner that a maximum direction-independent friction force is effective.

17. The friction damper according to claim 1, wherein the friction lining carrier is arranged in the housing so as to be tiltable about a tilting axis, wherein the tilting axis is arranged transversely with respect to the longitudinal axis.

18. The friction damper according to claim 1, wherein the friction lining carrier has a through-opening through which the tappet is guided, wherein the through-opening has a contour which is asymmetrical at least in sections perpendicularly to the longitudinal axis.

19. The friction damper according to claim 1, wherein the friction lining carrier has a through opening through which the tappet is guided, wherein the friction lining receptacle is configured as a depression in the through opening.

20. The friction damper according to claim 1, wherein the spindle nut is integrally connected with the locking element to form a one-piece spindle nut and locking element structure.

21. A friction damper comprising a. a housing having a longitudinal axis, b. a tappet that is displaceable along the longitudinal axis, c. a friction unit for generating a direction-dependent friction force on the tappet, wherein the friction unit comprises at least one friction lining that rests frictionally on the tappet and a friction lining carrier on which the at least one friction lining is held, wherein the friction lining carrier is arranged to be displaced relative to the tappet between an extraction position and an insertion position, d. a switching unit for variably setting the friction force, wherein the switching unit comprises i. a switchable actuator, ii. a locking element, iii. a force transmission unit which is mechanically coupled to the actuator and to the locking element, wherein the force transmission unit comprises a threaded spindle, wherein the force transmission unit comprises a gear, wherein the gear is configured as a reduction gear, wherein the actuator has a drive pinion on the motor shaft, which interacts with an internal toothing on the gear spindle, wherein the internal toothing is integrally designed in a sleeve section of the threaded spindle and is firmly coupled to the movement thread of the threaded spindle.

22. The friction damper according to claim 21, wherein the actuator comprises the motor shaft, wherein the actuator is configured to move the motor shaft.

23. A friction damper comprising a. a housing having a longitudinal axis, b. a tappet that is displaceable along the longitudinal axis, c. a friction unit for generating a direction-dependent friction force on the tappet, wherein the friction unit comprises at least one friction lining that rests frictionally on the tappet and a friction lining carrier on which the at least one friction lining is held, wherein the friction lining carrier is arranged to be displaced relative to the tappet between an extraction position and an insertion position, d. a switching unit for variably setting the friction force, wherein the switching unit comprises i. a switchable actuator, ii. a locking element, iii. a force transmission unit which is mechanically coupled to the actuator and to the locking element, wherein the force transmission unit comprises a threaded spindle, wherein the displacement transducer is held on the tappet by means of a magnet holder, said magnet holder has a fastening section with which the magnet holder is axially slidable attached to the tappet and is fastened therein.

24. The friction damper according to claim 23, wherein the magnet holder comprises a magnet holder recess, wherein displacement transducer comprises a magnet, the magnet being arranged in the magnet holder recess.

* * * * *